United States Patent [19]

Holasek et al.

[11] 4,228,804
[45] Oct. 21, 1980

[54] DIAGNOSTIC ULTRASONOGRAPHY UTILIZING FREQUENCY SPECTRUM ANALYSIS PRESENTED IN TERMS OF B-SCAN COLOR PATTERNS OR X-Y GRAPH DISPLAYS

[75] Inventors: Edward Holasek; Wayne D. Jennings, both of Cleveland, Ohio

[73] Assignee: Case Western Reserve University, Cleveland, Ohio

[21] Appl. No.: 882,149

[22] Filed: Feb. 28, 1978

Related U.S. Application Data

[63] Continuation-in-part of Ser. No. 690,605, May 27, 1976, abandoned.

[51] Int. Cl.³ .............................................. A61B 10/00
[52] U.S. Cl. ....................................... 128/660; 73/602
[58] Field of Search .......... 128/2 V, 2.05 Z, 660-663; 340/1 R, 5 MP; 364/484-485; 73/603, 602, 605

[56] References Cited

U.S. PATENT DOCUMENTS

| | | | |
|---|---|---|---|
| 2,618,968 | 11/1952 | McConnell | 73/597 X |
| 3,121,856 | 2/1964 | Finney | 340/1 R X |
| 3,156,110 | 11/1964 | Clgnes | 128/2 V X |
| 3,292,018 | 12/1966 | Clgnes | 310/8.1 X |
| 3,307,142 | 2/1967 | Doebler | 340/3 |
| 3,403,671 | 10/1968 | Flaherty et al. | 128/2 V |
| 3,566,408 | 2/1971 | Pederson | 343/17.1 X |
| 3,587,298 | 6/1971 | Jacobs | 73/607 X |
| 3,603,919 | 9/1971 | Moore | 340/1 R |
| 3,614,720 | 10/1971 | Ludlum | 340/3 R |
| 3,845,462 | 10/1974 | Blue et al. | 340/3 R |
| 3,856,985 | 12/1974 | Yokoi et al. | 128/2 V X |
| 3,909,771 | 9/1975 | Pickering et al. | 340/1 R |
| 3,918,025 | 11/1975 | Koshikawa et al. | 340/1 R |
| 3,922,911 | 12/1975 | Groves et al. | 73/194 A |
| 4,026,144 | 5/1977 | Gericke et al. | 73/603 X |

OTHER PUBLICATIONS

Jennings, W. et al., "High Resolution Instantaneous Ultrasonic Spectrum Analysis I:Theoretical Considerations", Proc. of AIUM, Oct. 30–Nov. 4, 1977, pp. 407–415.

Wild, J. J. et al., "The Effects of Biological Tissues on 15 MHz Pulsed Ultrasound", Jrnl. Ac. Soc., vol. 25, No. 2, Mar. 1953, pp. 270–281.

Holasek, E. et al., *Direct Contact Hand-Held Diagnostic B-Scanner*, UTS Symp Proc., Oct. 4–7, 1972, Boston, Mass., pp. 38–43.

Levin, M. J., *Instantaneous Spectra and Ambiguity Functions*, IEEE Trans. Inf. Theory, vol. II-10, pp. 45–97, 1964.

Page, C. H., *Instantaneous Power Spectra*, Jrnl. Appl. Phys., vol. 23, No. 1, pp. 103–106, 1952.

Namery, J. et al., "Ultrasonic Detection of Myocardial Infarction in Dog", IEEE Group on Sonics & Ultrasonics, Oct. 1972, pp. 491–494.

Holasek, E. et al., "Recognition of Tissue Patterns by UTS Spectroscopy", 18th Annual Conf. Amer. Inst. Ultrasd in Med., Ann Arbor, Mich., Oct. 1973, pp. 73–76.

Holasek, E. et al., "A Method for Spetra-Color B-Scan Ultrasonography", Jrnl. of Clin. Ultrasound V3#3, Jul. 1975, pp. 175–178.

Purnell, E. W. et al., Clinical Spectra-Color Ultrasonography", Jrnl. of Clin. Ultrasound, V. 3, No. 3, Jul. 1975, pp. 187–189.

Holasek, E. et al., "Spectra-Color Ultrasonography I:Principles of a Technique for Incorporating Spectral Information into a B-Scan Display", 21st AIUM, San Francisco, Aug. 3–7, 1976, pp. 1739–1745.

*Primary Examiner*—Robert W. Michell
*Assistant Examiner*—Francis J. Jaworski
*Attorney, Agent, or Firm*—Pearne, Gordon, Sessions, McCoy

[57] ABSTRACT

Ultrasonographic means and method for visualizing the internal structure and composition of an in vivo soft tissue specimen as a function of its effect on the frequency spectrum of an applied complex wave pulse of short duration provided by a single wideband, shock-excited transducer utilized in the pulse-echo mode. Echo trains spatially related to the specimen structure are bandpass filtered to provide a plurality of spectrum signals indicative of the frequency content of each echo train as a function of time. In a first display mode a plurality of three spectrum signals are primary color-coded and combined to present a multicolor B-scan ultrasonogram permitting characterization of tissue specimen locations in terms of their frequency response as related to the color spectrum correlated to the frequency spectrum. In a complementary second display mode providing higher frequency resolution, a larger plurality of spectrum signals are presented in graph form in a monochrome ultrasonogram permitting detailed characterization of a single A-scan line segment of a tissue specimen as a function of its frequency response. Both display modes are enhanced by modifying the spectrum signals to represent the instantaneous power spectrum of the echo train of the applied pulse as affected by the scanned tissue specimen.

16 Claims, 11 Drawing Figures

DIAGNOSTIC ULTRASONOGRAPHY UTILIZING FREQUENCY SPECTRUM ANALYSIS PRESENTED IN TERMS OF B-SCAN COLOR PATTERNS OR X-Y GRAPH DISPLAYS

CROSS-REFERENCES TO RELATED APPLICATIONS

The present application is a continuation-in-part of application Ser. No. 690,605, filed May 27, 1976, now abandoned.

FIELD OF THE INVENTION

The present invention is directed generally to improvements in diagnostic ultrasonography and, more specifically, to means and method for incorporating tissue frequency response information into ultrasonograms particularly useful in diagnosing, for example, benign and malignant tumors of the eye.

DESCRIPTION OF THE PRIOR ART

As a transmitted ultrasonic pulse impinges on soft tissue boundaries, portions of the pulse are reflected to form a part of an echo train and portions of the pulse are absorbed at or transmitted through soft tissue boundaries. Such a phenomenon forms a basis for the well-known pulse-echo method utilized in many known diagnostic ultrasonographic techniques.

It is further known in the art that the reflection absorption-transmission characteristics of a soft tissue boundary are frequency dependent, and that normal and pathological tissue states affect such frequency dependence.

Incorporation of such frequency dependence information into ultrasonograms of, for example, the B-scan and A-scan types, advantageously enhances the diagnostic value of the ultrasonograms. Not only is the geometrical structure of the tissue visualized, but also the composition of the tissue may be characterized in terms of its frequency response.

The incorporation of tissue frequency response information into diagnostic ultrasonograms has been attempted.

U.S. Pat. No. 3,156,110 to Clynes discloses means and method for combining a number of separate color-coded B-scan ultrasonograms taken at different scanning frequencies.

The art is further represented by the following technical publications, incorporated by reference in their entirety.

"The Effects of Biological Tissue on 15 MHz Pulsed Ultrasound," Acoustic Society of America, Volume 25, pp. 270-281, 1953.

"Recognition of Tissue Patterns by Ultrasonic Spectroscopy," "Ultrasonic Symposium Proceedings," Cat. No. 73 CHO 807-8 SU, 1973, Sponsored by IEEE Group on Sonics and Ultrasonics.

SUMMARY OF THE INVENTION

A short duration, wideband transducer generated, complex wave pulse is applied to a tissue specimen segment. A resultant reflected echo train portion of the applied pulse is bandpass-filtered to provide a plurality of spectrum signals indicative of the frequency content of the echo train. Each spectrum signal represents a predetermined frequency band generally within the frequency band of the applied complex wave pulse.

In a first time domain display mode, herein arbitrarily termed "Spectra-color B-scan," a plurality of three spectrum signals generally indicative of the frequency content of multiple B-scan-acquired echo trains are each color-coded with a unique one of the primary colors.

The color-coded spectrum signals are then processed to represent respective individual single-color B-scans which are combined in overlaying fashion, either electronically or photographically, to provide a multicolor B-scan ultrasonogram which, in addition to indicating conventional echo amplitude and acoustic travel time information permitting tissue structure visualization, includes tissue frequency response information wherein a particular color connotes a predetermined frequency range indicative of tissue composition.

In a second higher frequency resolution time domain display mode, complementary to Spectra-color B-scan, a larger plurality of spectrum signals, more exactly indicative of the frequency content of a single A-scan line segment echo train, are graph-displayed on X-Y axes in a monochrome ultrasonogram as a function of their frequency band representation and acoustic travel time. Echo amplitude is indicated on a Z-axis by an intensity modulated CRT beam, for example. This second mode of display is arbitrarily termed "Frequency Scan" or "F-scan."

Spectra-color B-scan and F-scan ultrasonograms can be enhanced in accordance with the invention by modifying the bandpass filter generated spectrum signals to represent the instantaneous power spectrum of the echo portion of the applied pulse as affected by the scanned tissue specimen. Such modification is accomplished prior to ultrasonogram formation by multiplying each spectrum signal by the echo train from which it was derived, the respective echo train being delayed for a period of time approximately equal to the time required for its filtering to provide the associated spectrum signal. When multiplication occurs, the echo train and a respective one of the filtered spectrum signals derived from it are in phase with each other, a mathematical precondition necessary to the derivation of the instantaneous power spectrum.

Further in accordance with the invention, the Spectra-color B-scan and F-scan ultrasonograms can be assembled using only negative portions of the spectrum signals modified to represent the instantaneous power spectrum noted previously. Such a Spectra-color B-scan or an F-scan is herein arbitrarily termed "Negative Scan" modified or "N-scan modified."

The above-noted ultrasonograms in accordance with the present invention constitute superior aids in the diagnosis of tissue aberrations.

BRIEF DESCRIPTION OF THE DRAWINGS

Further aspects and advantages of the invention will become apparent to those skilled in the art upon a comprehensive understanding of the preferred embodiments of the invention shown in the accompanying drawings, wherein.

DETAILED DESCRIPTION OF THE PREFERRED EMBODIMENT

While the following particular means, method, and operating parameters are directed to opthalmic examinations utilizing ultrasonography, it is recognized that the present invention has diagnostic applications in the areas of obstetrics, gynecology, cardiology, and the like. It is further recognized that the present invention may have applications in the structural and compositional characterization of organic and inorganic specimens wherein ultrasonic and nonultrasonic specimen interrogation frequencies may be utilized.

Figure 1:
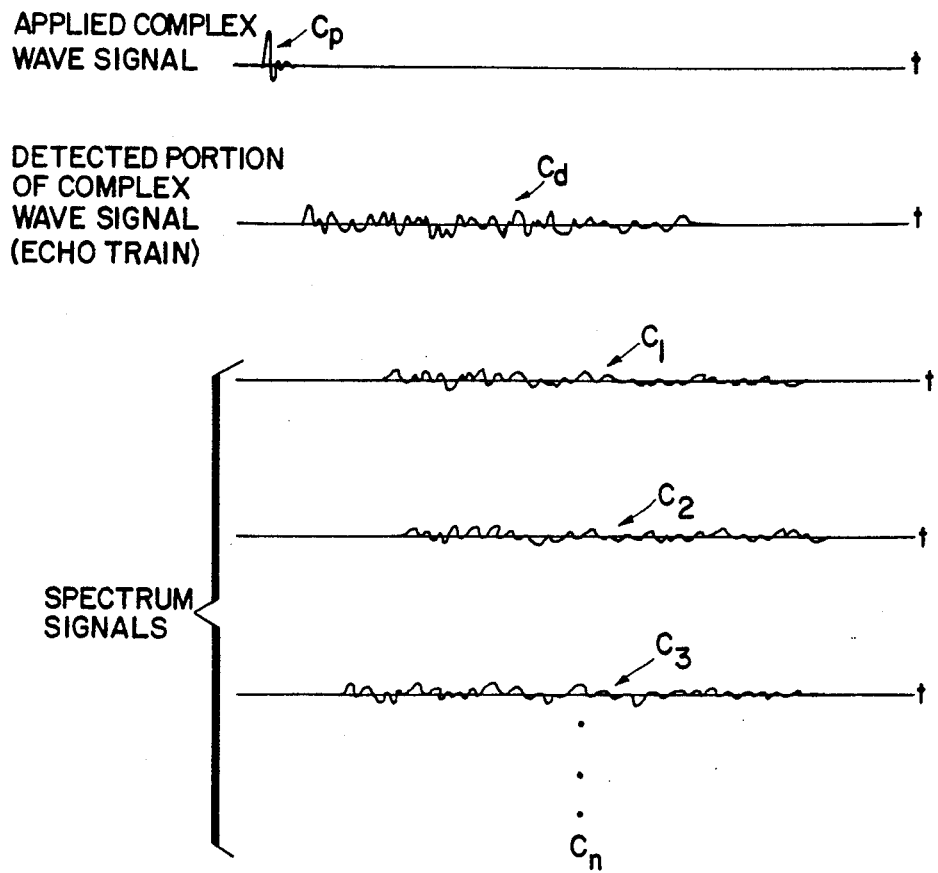
FIG. 1 illustrates, by graph presentation, the relationship between a complex wave signal, an echo train signal, and spectrum signals in accordance with the invention.
Figure 2:
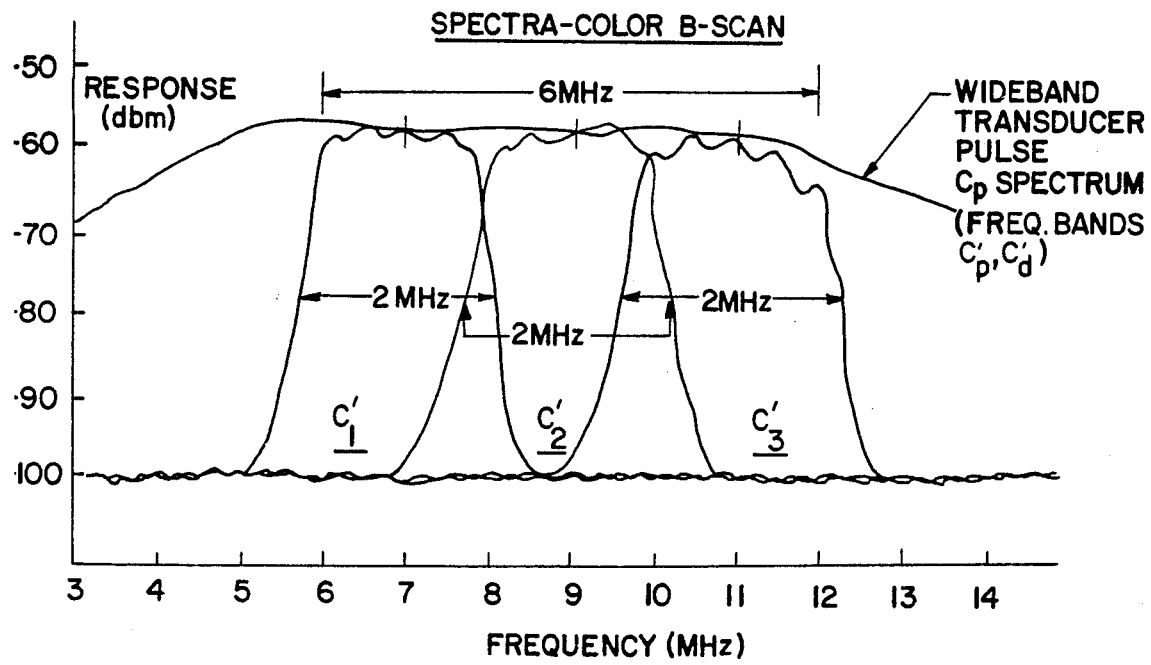
FIG. 2 illustrates, by graph presentation, the relationship between the frequency bands of three spectrum signals relative to the frequency band of an ultrasonic wide-band transducer generated pulse, the three spectrum signals being utilized to form a Spectra-color B-scan ultrasonogram.
Figure 3:
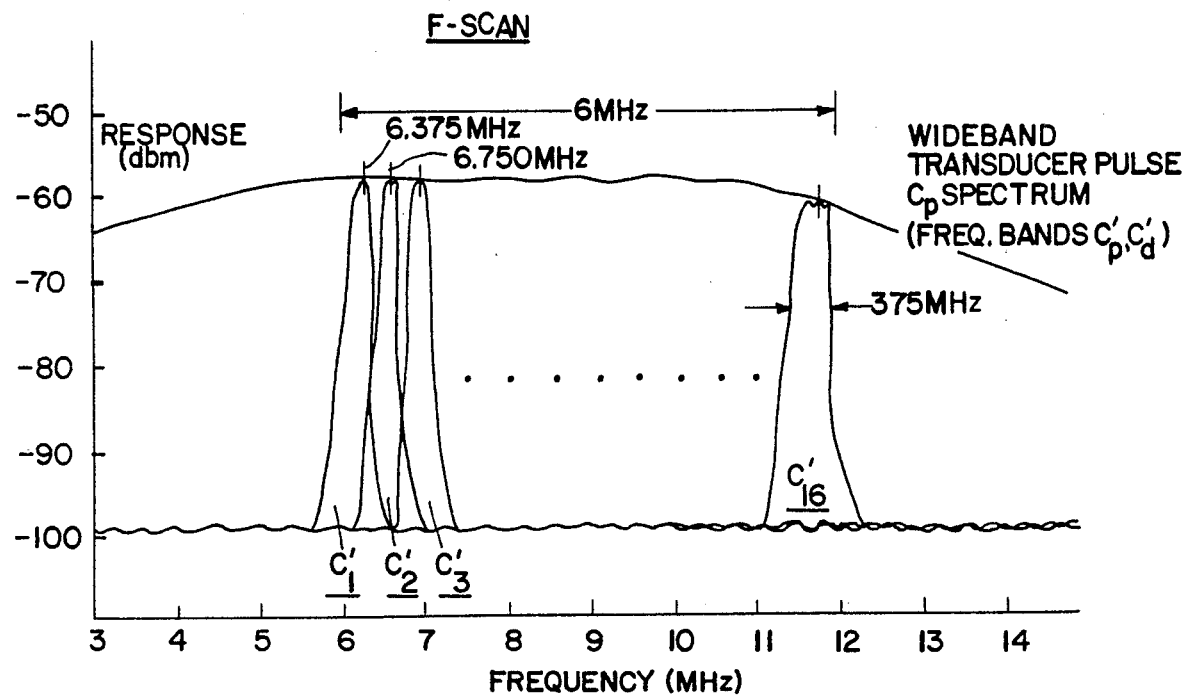
FIG. 3 illustrates, by graph presentation, the relationship between the frequency bands of a large plurality of spectrum signals relative to the frequency band of an ultrasonic wideband transducer-generated pulse, such large plurality of spectrum signals being utilized to form an F-scan ultrasonogram.

Referring to FIGS. 1 through 3, a first signal in the form of at least one short duration (0.25-0.30 microseconds) complex wave pulse $C_p$ of two or three cycles, inherently rich in frequency content, is generated by a highly damped, shockexcited wideband ultrasonic transducer. The complex wave pulse $C_p$ has a frequency band $C_p'$ extending generally symmetrically to the sides of an approximate 9 MHz center frequency with a fractional bandwidth of approximately 66 percent covering the frequency range of 6-12 MHz, such a frequency range being particularly useful for penetration of soft tissue to a predetermined depth.

The complex wave pulse $C_p$ is applied to a specimen, such as in vivo occular soft tissue. A portion of the applied pulse $C_p$ as effected by the specimen is detected. This detected signal portion or echo train $C_d$ is composed of tissue boundary reflected and back-scattered parts of the applied complex wave pulse $C_p$. The ultransonic echo train $C_d$ extends over a time period (50-60 microseconds) substantially longer by orders of magnitude than the time period of the applied pulse $C_p$. The time duration ratio between the pulse $C_p$ and the detected echo train $C_d$ is dependent upon the applied pulse $C_p$ tissue penetration depth, which in turn is a function of, for example, the frequency, amplitude, and manner of application of pulse $C_p$. The application of the pulse $C_p$ and detection of a specimen effected portion of it, such as the echo train $C_d$, is generally in accordance with the known pulse-echo method of tissue interrogation.

In accordance with the invention, the echo train $C_d$ is bandpass-filtered to provide a plurality of frequency component spectrum signals $C_1$–$C_n$ indicative of the frequency content of the detected echo train $C_d$.

With particular reference to FIGS. 2 and 3, each spectrum signal $C_1$–$C_n$ represents as a function of time those frequency components of the detected echo train $C_d$ lying within corresponding adjacent frequency bands $C_1'$–$C_n'$ of generally equal bandwidths extending over the generally identical frequency bands $C_p'$, $C_d'$ of the applied complex wave pulse $C_p$ and the resultant detected portion echo train $C_d$. Each spectrum signal represents a predetermined portion of the frequency spectrum of the detected echo train $C_d$ which is inherently related to the frequency spectrum of the applied pulse $C_p$ extending over approximately 6-12 MHz. The plurality of spectrum signals, provided by bandpass filtering, generally represents the approximate time domain Fourier Series of the echo train portion $C_d$, the degree of frequency resolution depending upon the number of spectrum signals $C_1$–$C_n$ generated.

In accordance with the invention, two display modes utilizing differing degrees of frequency resolution adapted to particular ultrasonogram display formats are utilized.

A first display mode, herein arbitrarily termed "Spectra-color B-scan," is exemplified by FIG. 2. A plurality of three spectrum signals (low Hz, mid Hz, high Hz) having corresponding generally symmetrical adjacent frequency bands $C_1'$, $C_2'$, $C_3'$, with approximately 2 MHz bandwidths and respective 7, 9, and 11 MHz center frequencies, extend over the 6 MHz bandwidth of the applied pulse $C_p$ and related echo train $C_d$. Each of the three spectrum signals is color-coded with one of the primary colors. These color-coded spectrum signals are generated as a function of time by a B-scan, two-dimension, cross section sweep of the ultrasonic transducer. The B-scan generated spectrum signals are each utilized to form separate color-coded (red, green, blue) B-scan ultrasonograms which are overlayed by photographic or electronic means to form a multicolor B-scan ultrasonogram, herein referred to as a "Spectra-color B-scan ultrasonogram." The Spectra-color B-scan ultrasonogram, in addition to representing gray scale quality structural characteristics common to known B-scan ultrasonograms, characterizes tissue locations in terms of overlayed additional color patterns wherein the color spectrum correlates to the frequency spectrum in a predetermined relationship.

The Spectra-color scan is a frequency-coded gray scale B-scan ultrasonogram wherein frequency coding is in terms of color patterns. For example, Spectra-color B-scan ultrasonograms of eyes containing large and small malignant melanomas depict such melanomas in specific spectral reflectivity patterns of red, green, and yellow, thus representing the lower and mid-frequency bands $C_1'$–$C_2'$ illustrated in FIG. 2. The diagnostic interpretations of Spectra-color B-scans are further described in the following technical publication incorporated by reference in its entirety:

"Clinical Spectra-color Ultrasonography" Journal of Clinical Ultrasound, Volume 3, pp. 187-189, 1975.

Turning to FIG. 3, a second display mode offering higher frequency resolution, herein arbitrarily termed "F-scan," is exemplified. In the F-scan mode, a larger plurality of spectrum signals $C_1-C_n$ represents a more detailed time domain Fourier Series of the echo train portion $C_d$ of the applied complex wave pulse $C_p$ as effected by the specimen. For purposes of illustration, 16 spectrum signals representing 16 generally adjacent and symmetrical frequency bands of approximately equal 375 KHz bandwidths are utilized with respective center frequencies of 6.375 MHz, 6.750 MHz, etc. It is to be recognized that larger numbers of frequency bands, such as 32, 100, or 200, could be utilized where higher frequency resolution is desired.

In the F-scan mode, the complex wave pulse $C_p$ is applied to a single A-scan line segment of a tissue specimen. Sixteen spectrum signals $C_1-C_{16}$, generated by bandpass filtering, are X-Y graph displayed in a monochrome format to form an F-scan ultrasonogram of a single A-scan line tissue segment. The 16 spectrum signals are displayed along a frequency X-axis, a time domain Y-axis, and an amplitude indicative Z-axis, such as an intensity-modulated Z-axis.

The Spectra-color B-scan and F-scan modes both utilize visual formats simultaneously displaying the spectrum signals as a function of the time between applying the pulse $C_p$ and detecting its respective echo train $C_d$, that is, as a function of acoustic travel time.

Frequency and amplitude comparison of the spectrum signals is evidenced in the Spectra-color B-scan mode by color hues and intensitites, while in the F-scan mode such comparison is accomplished by X-axis frequency and Z-axis intensity indications. The display modes in accordance with the invention provide frequency and amplitude comparison formats which constitute a distinctive indication of the relative energy content of the spectrum signals, each of which is indicative of a predetermined frequency content portion of the frequency spectrum of the detected echo train $C_d$ of the applied complex wave pulse $C_p$.

The Spectra-color B-scan and F-scan modes are complementary in that an initial cross section Spectra-color B-scan of a specimen can be used to generally locate an area of suspected tissue aberration. Once such a suspect area is located, an F-scan of a signal one of the A-scan line segments used to assemble the Spectra-color B-scan ultrasonogram can be taken, the F-scan providing higher frequency resolution than the Spectra-color B-scan at the expense of the cross section dimension provided by the Spectra-color B-scan.

In practice, the heretofore described Spectra-color B-scan and F-scan methods are incorporated into a unitary electronic system, which will now be described.

Figure 4:
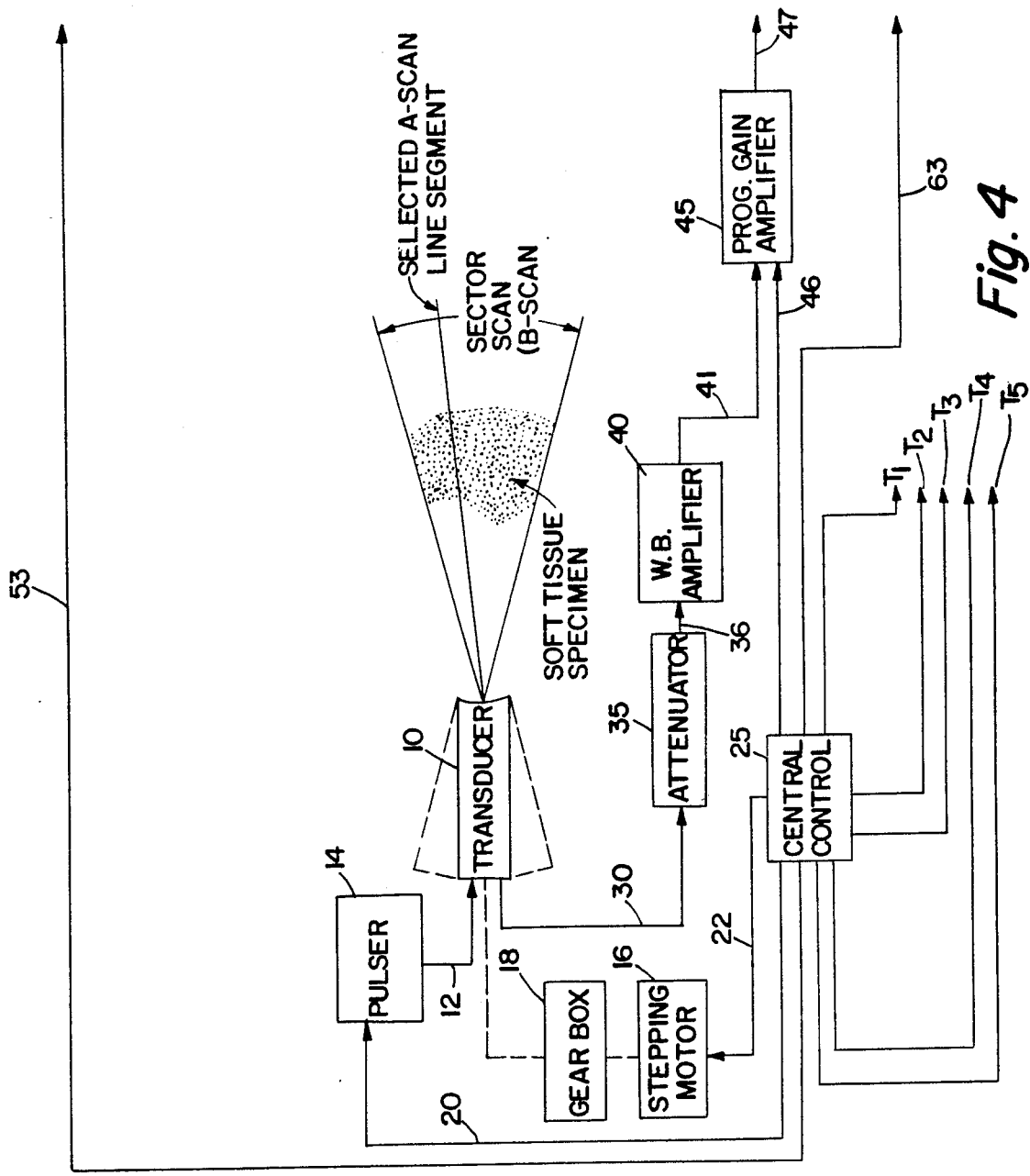
FIGS. 4, 4a and 4b illustrate, in block diagram form, electronic means for Spectra-color B-scan and F-scan display modes in accordance with the invention, including means for modifying the spectrum signals to represent instantaneous power spectra.
Figure 4A:
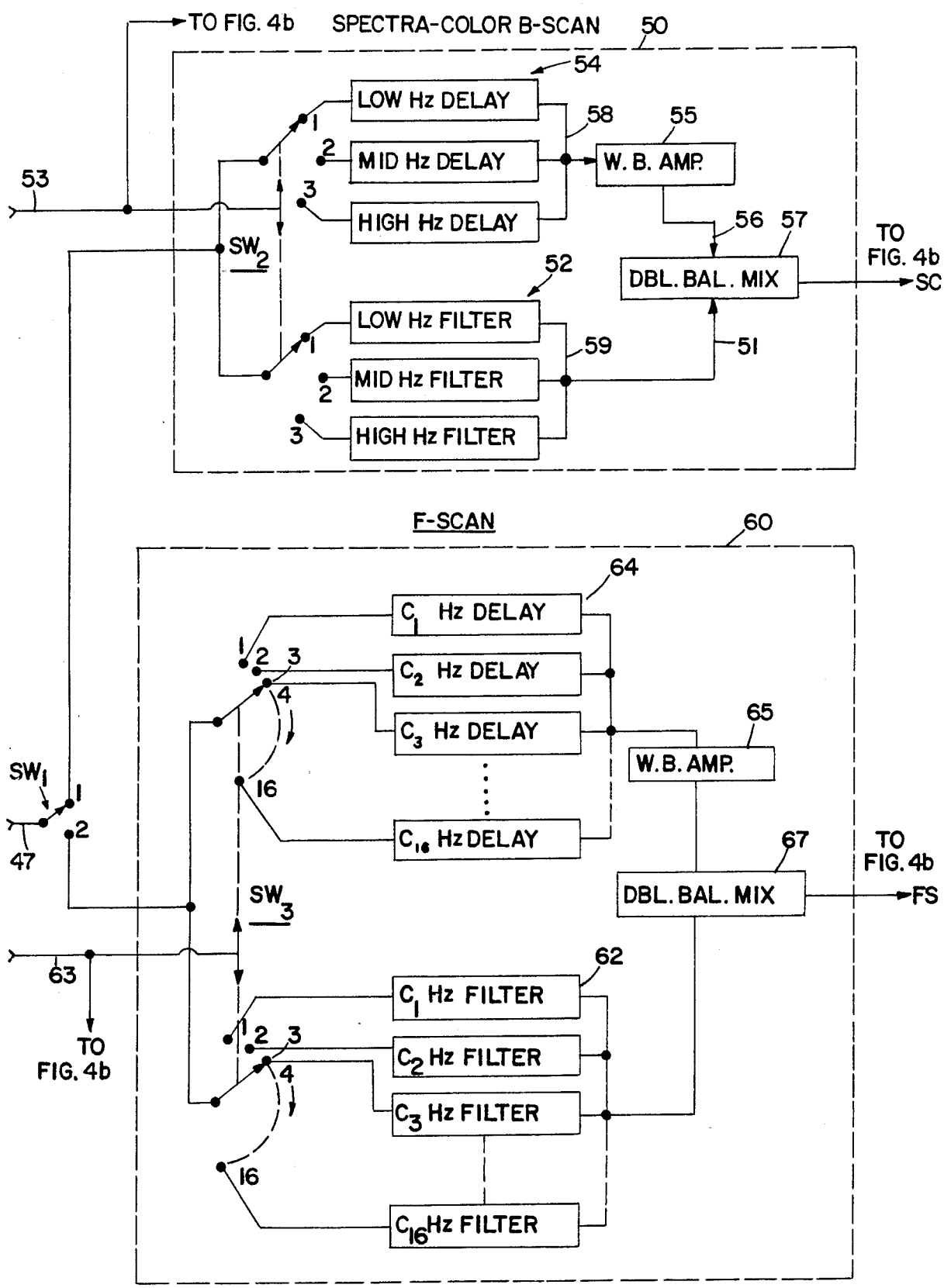
Figure 4B:
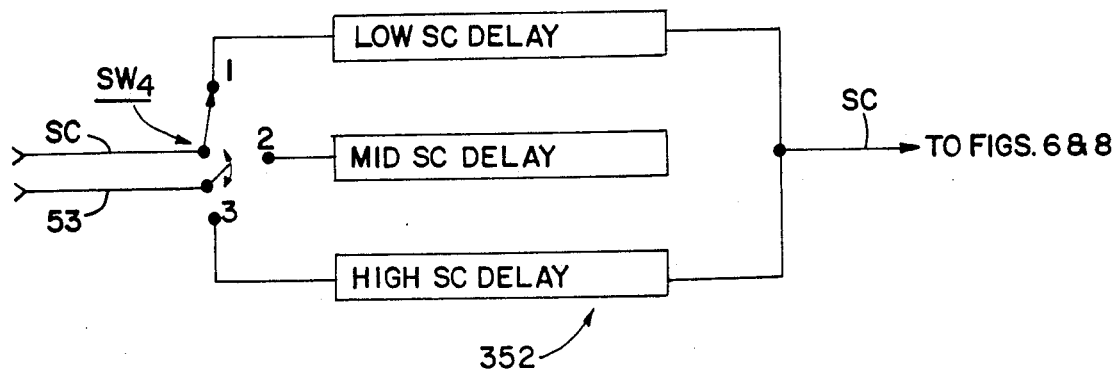
Figure 4B:
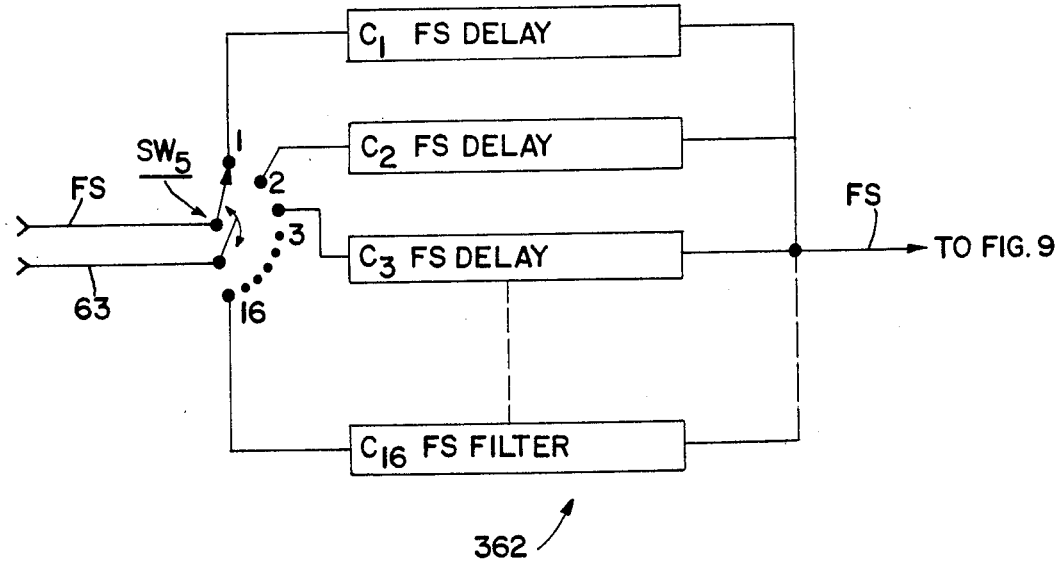

FIGS. 4, 4a and 4b illustrate electronic means for forming respective Spectra-color B-scan and F-scan ultrasonograms.

A digitally controlled, wideband transducer 10 (FIG. 4) for generating and detecting the heretofore described complex wave ultrasonic signals $C_p$ and $C_d$, respectively, is positioned adjacent a soft tissue specimen, such as eye tissue, to which the pulse $C_p$ is applied. The transducer 10 is capable of, for example, taking a sector scan of the tissue specimen, such as a sector B-scan composed of a large plurality of A-scan line segments. The sector B-scan is composed of, for example, 400 separate A-scan line segments. The transducer 10 is, for example, of the highly damped, lead-metaniobate type and includes an acoustic focusing lens providing a 70 mm. focal length. Axial resolution is approximately 0.3 mm., while lateral resolution varies from 0.4 mm. to 1.0 mm., depending upon the signal strength of a related high energy, shock-excitation pulse 12 provided by a capacitive discharge pulser 14.

Mechanical scanning movements of the transducers 10 are controlled by a stepping motor 16 and a gear box 18 interposed between the transducer 10 and the stepping motor 16.

The motor 16 and gear box 18 provide, for example, a 22.5-degree sector scan (B-scan) in 0.5 seconds, each sector scan containing 400 discrete A-scan line segments.

A suitable digitally controlled transducer package is disclosed in the following technical publication incorporated by reference in its entirety:

"Direct Contact, Hand-Held, Diagnostic B-Scanner," Journal of Clinical Ultrasound, Volume 1, No. 1, March 1973.

A central control unit 25 supplies appropriate pulser initiating signals 20 and transducer position initiating signals 22 as indicated.

Immediately subsequent to the application of a pulse $C_p$ to the specimen, the tranducer 10, in a detecting mode, receives the echo train $C_d$ reflected from various tissue boundaries traversed by the applied pulse $C_p$.

Successive detected portions or echo trains $C_d$, resulting from successive pulses $C_p$ generated during sector scanning, are provided as a detected wideband signal 30 to an appropriate attenuator 35 which provides the maximum linear range of the signal 30 for optimum production of the display patterns to be subsequently discussed. The attenuator 35 provides maximum signal amplitude without signal saturation. A suitable manually adjustable attenuator having a 100 db range provided in 1 db steps has been found to be acceptable.

The attenuated echo train containing wideband signal 36 is fed through a wideband amplifier 40 providing, for example, 40 db of amplification over a 100 Hz to 35 MHz range. Such a wideband amplifier 36 is typical of the other wideband amplifiers to be subsequently discussed.

The amplified wideband signal 41 is provided to a programmable gain amplifier 45 regulated by a gain control signal 46 provided by the central controller 25. The amplifiers 40, 45 provide approximately 80 db of amplification to the attenuated detected wideband signal 30. The gain of the amplifier 45 is adjusted to provide normalization of signals emanating from filters 52,62 (FIG. 4a), which will be subsequently discussed. Such normalization could also be accomplished by utilizing suitable amplifiers at the outputs of filters 52,62.

Turning to FIG. 4a, the programmable gain amplified wideband signal 47 is provided via a scan selector switch $SW_1$ to a Spectra-color B-scan signal processing means 50 or an F-scan signal processing means 60.

The signal processing means 50 includes three bandpass filters 52 (low Hz, mid Hz, high Hz) and three corresponding delays 54 (low Hz, mid Hz, high Hz). The frequency responses of the filters 52 equate to the spectrum signal frequency bands $C_1'$, $C_2'$, $C_3'$ previously described with regard to FIG. 2. The filters 52 are of the real type in that they provide generally constant delay to input signals over their entire filter bandwidths (approx. 2 MHz).

The delays 54 correspond to the inherently delaying filters 52 and function to delay filter input signals for a period of time equal to the delay provided by their respective filters.

A ganged double pole, multiple throw switch SW$_2$ simultaneously provides an input signal, such as echo train signal 47, to the three filter-delay pairs 52–54 in sequence in accordance with synchronizing signals 53 received from the central control 25. In practice, switch SW$_2$ is a known high-speed electronic switch, as opposed to the simplified switch schematic illustrations of FIG. 4a.

A wideband amplifier 55 is interposed between the delay outputs 58 and a first input 56 of a double-balanced mixer 57. The filter outputs 59 are provided to a second input 51 of the double-balanced mixer. The double-balanced mixer 57 serves to multiply the delayed filter inputs by the equally delayed filter outputs to provide Spectra-color signals SC representing the three spectrum signals C$_1$, C$_2$, C$_3$. At the time of multiplication, the filter outputs and delayed filter inputs are in phase with each other and normalized relative to each other by the action of the programmable gain amplifier 45 and the wide band amplifier 55.

The significance of the noted delays 54 and double-balanced mixer 57 will now be explained with regard to processing the filter output spectrum signals C$_1$,C$_2$,C$_3$, wherein the modified spectrum signals C$_1$,C$_2$,C$_3$ are indicative of the instantaneous power spectra of the echo trains C$_d$.

The art of instantaneous power spectra analysis is represented by the following publications incorporated in their entirety:

"Instantaneous Spectra and Ambiguity Functions," I.E.E.E. Transactions Information Theory, Vol. IT-10, pp. 95–97, 1964

"Instantaneous Power Spectra," Journal of Applied Physics, Vol. 23, No. 1, pp. 103–106, 1952

"High Resolution Instantaneous Ultrasonic Spectrum Analysis I: Theoretical Consideration," orally presented Oct. 30–Nov. 4, 1977, Proceedings of America Institute of Ultrasound in Medicine, Dallas, Tex.; published May 1978, Ultrasound In Medicine, Volume 4.

In accordance with the present invention, the instantaneous power spectrum, as represented by the modified spectrum signals C$_1$-C$_n$, is a time-dependent spectral decomposition of each detected signal portion or echo train C$_d$. The present invention provides spectral decomposition through filtering.

For purposes of analysis let the time-varying echo train signal C$_d$(t) be represented as g(t). The instantaneous power spectrum, $\rho_s(t,\omega)$, is defined as $$\rho_s(t,\omega) = \tfrac{1}{2} \tfrac{\partial}{\partial t} [\ |G_t(\omega)|^2 - |G_t^+(\omega)|^2\ ] \quad (1)$$

$$\text{where } G_t(\omega) = \int_{-\infty}^{t} g(x)e^{-j\omega x}dx \quad (2)$$

and $$G_t^+(\omega) = \int_{t}^{\infty} g(x)e^{-j\omega x}dx \quad (3)$$

$G_t(\omega)$ = running Fourier transform of g(t)

$G_t^+(\omega)$ = reverse-time running Fourier transform of g(t)

In equations 1, 2, and 3, $G_t(\omega)$ is the frequeny spectrum of the signal g(t) up to a time (t) while $G_t^{30}(\omega)$ represents the frequency spectrum of the signal g(t) from time t to infinity.

In the heretofore-described embodiment of the invention, function g(t) [C$_d$(t)] is the instantaneous voltage produced by the transducer 10 in its detection mode as the ultrasonic echo C$_d$ impinges on the piezoelectric surface of the transducer 10.

It is assumed that g(t) is proportional to the instantaneous acoustic pressure of the detected ultrasonic signal.

Useful properties of the instantaneous power spectrum as noted above include:

(1) The instantaneous power spectrum as defined and utilized in the invention is a real valued function of time.

(2) The noted integration over all time advantageously provides the power spectral density.

(3) The noted integration over all frequencies advantageously provides the instantaneous power of the signal C$_d$.

(4) The noted integration over all time and all frequency advantageously provides the total power of the signal C$_d$.

(5) The noted instantaneous power spectrum has time-reversal symmetry.

In accordance with the invention, the instantaneous power is displayed for each frequency band C$_1'$-C$_n'$ (FIGS. 2 and 3) spanning the frequency range (C$_p'$,C$_d'$) of the echo train C$_d$.

For the nth frequency band, the band limited instantaneous power J$_n$(t) is defined by:

$$J_n(t) = \int_{-\infty}^{\infty} \rho_s(t,\omega)F_n(\omega)d\omega \quad (4)$$

where F$_n(\omega)$ is the function describing the action of a filter, such as filters 52,62 (FIG. 4a) in the frequency domain. With the use of a "real-type" filter, as described with reference to FIG. 4a, the band limited instantaneous power is given by:

$$J_n(t) = g(t)\ Re\ [g(t)^*F_n(t)]\cdot 2\pi \quad (5)$$

$$F_n(t) = \frac{1}{2\pi} \int_{-\infty}^{\infty} F_n(\omega)e^{j\omega t}d\omega \quad (6)$$

The function g(t) of equation (5) represents the broadband signal C$_d$, while the term [g(t)*F$_n$(t)] represents the filter provided spectrum signal C$_1$-C$_n$ in the time domain.

It can be seen that the band limited instantaneous power J$_n$(t) is the product of the broadband signal g(t) [C$_d$(t)] with the filter provided signal C$_1$-C$_n$ represented as the real part of g(t)*F$_n$(t).

Since equation (5) requires that the filter function F$_n(\omega)$ be a real valued function of frequency, filters 52,62 (FIG 4a) must, in effect, appear to be non-delaying.

Since actual filters always have delays, the broadband echo train formed signal 47 is delayed for a time period corresponding to the particular filter operating on it. The delayed signal is then multiplied by the filter supplied spectrum signal derived from it.

Figure 5:
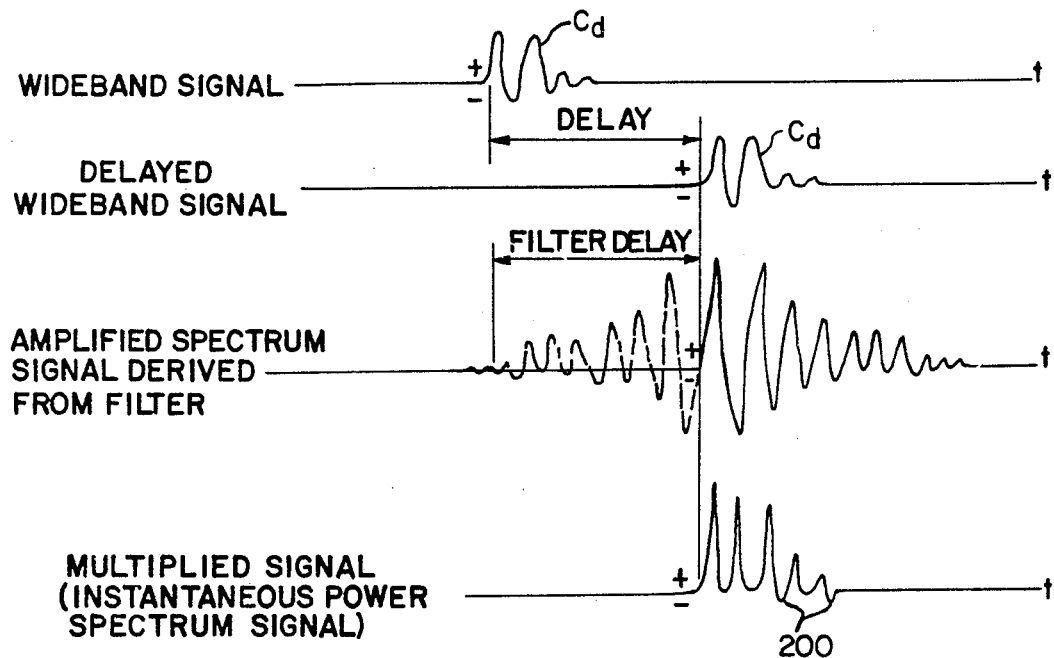
FIG. 5 illustrates, by graph presentation, the relationship between ultrasonographic signals required in modifying the spectrum signals to represent the instantaneous power spectra in accordance with the invention.

Turning to FIG. 5, the time-phase relationship between a wideband signal or echo train C$_d$ as delayed and a filter delayed spectrum signal derived from the echo train $C_d$ is illustrated. It can be seen that at the time of multiplication, the spectrum signal $C_1$-$C_n$ and the echo train $C_d$ from which it was derived are in phase with each other in accordance with the invention.

The present invention also contemplates using only the negative portions 200 of the instantaneous power spectrum modified spectrum signals in the heretofore-noted Spectra color B-scan and F-scan modes. Such a utilization of the negative portions 200 is herein arbitrarily termed N-scan.

Returning to FIGS. 4 and 4a, in the Spectra-color B-scan mode of operation with switch $SW_1$ in its noted first position, the following signal processing steps evolve in accordance with the invention.

To electronically form a Spectra-color B-scan ultrasonogram as previously noted the transducer 10 is positioned in a vertical plane adjacent eye tissue. The transducer is cycled to a far left or right position by the stepping motor 16. The transducer moves to the first of 400 A-scan line segment positions.

The pulser 14 initiates a transducer-generated complex wave pulse $C_p$, as discussed with regard to FIGS. 1 and 2. The pulse $C_p$ penetrates the eye tissue along a rod-like, axially extending A-scan line segment of tissue. The resultant reflected echo train $C_d$ is detected by the transducer 10. The detected portion of the pulse $C_p$, echo train $C_d$, is applied simultaneously to the low Hz filter and the corresponding low Hz delay. A first low Hz spectrum signal $C_1$ is provided at the low Hz filter output 58, while the delayed echo train portion $C_d$ from which the spectrum signal $C_1$ was derived is provided at the output 59 of the low Hz delay. The amplified delayed echo train portion $C_d$ is then multiplied by the spectrum signal $C_1$ to provide a modified, instantaneous power-indicative spectrum signal which forms a portion of the Spectra-color signal SC.

Without movement of the transducer, a second complex wave pulse $C_p$ substantially identical to the first is applied to the same A-scan line tissue segment. A resultant second echo train portion $C_d$ generally identical to the first echo train portion $C_d$ is simultaneously provided as heretofore described to the mid Hz filter and the mid Hz delay, the switch $SW_2$ having been cycled to its second position by a control signal 53 from control 25. The output of the mid Hz filter provides a second spectrum signal $C_2$ as previously discussed with regard to FIGS. 1 and 2. The second spectrum signal $C_2$ is multiplied by the delayed echo train portion $C_d$ from which it was derived as previously discussed with regard to the first spectrum signal $C_1$.

With switch $SW_2$ in its third position, a third complex wave echo train $C_d$, generally identical to the first and second portions $C_d$, is processed as noted above to provide a high Hz spectrum signal.

The transducer now moves to a second of 400 positions and performs the above-noted three pulse A-line scan. The process is repeated for all 400 A-scan line segments constituting a sector scan of the B-scan type. With the heretofore noted 0.5 sec. rate for a 22.5-degree sector scan, an applied pulse $C_p$ repetition frequency of approximately 2000 Hz is utilized.

To photographically form a Spectra-color B-scan ultrasonogram as previously noted, three separate B-scan sector scans are performed. For each of the sector scans, the switch $SW_2$ is in a unique one of its three noted positions, with only a single pulse being applied to each A-scan line segment during a sector scan. The processing of each echo train portion $C_d$ in the photographic mode is comparable to the processing noted above with regard to the electronic mode, with only the sequence of the scan-derived echo trains $C_d$ differing. In the photographic mode and the electronic mode, approximately 1200 echo trains are processed to form an instantaneous power spectra indicative Spectra-color B-scan.

Turning to the higher frequency resolution F-scan signal processing means 60, with the switch $SW_1$ in its noted second position, applied pulses $C_p$ are generated and detected echo train portions $C_d$ are processed as noted above with regard to Spectra-color B-scan but for the following differences.

With reference to FIGS. 3, 4, and 4a, the transducer is fixed at a chosen one of 400 A-scan line segment positions. Sixteen pulses $C_p$ are generated. Sixteen sequential, generally identical reflected echo train portions $C_d$ are each fed to a respective one of the 16 filter-delay pair 62-64 by cycling a second ganged, double pole, multiple throw switch $SW_3$ through its noted 16 positions, the switch $SW_3$ being regulated by appropriate synchronizing switching signals 63 provided by the central conrtrol 25. A wideband amplifier 65 and a double-balanced mixer 67 perform in a manner analogous to those of the Spectra-color B-scan means 50. The F-scan signal FS includes 16 spectrum signal $C_1$-$C_{16}$ related to frequency bands $C_1'$-$C_{16}'$, as illustrated by FIG. 3.

It is recognized that some of the elements of the Spectra-color B-scan means 50 and the F-scan means 60 could be common to both signal processing means 50,60. It is further recognized that a single echo train portion $C_d$ could be simultaneously filtered, thus reducing the number of Spectra-color B-scan pulses $C_p$ by a factor of 3, and thus reducing the number of F-scan pulses $C_p$ by a factor of 16. Present electronic capabilities necessitate the pulse processing redundancy noted above in order to generate the unique spectrum signals $C_1$-$C_n$ for each echo train $C_d$.

Figure 6:
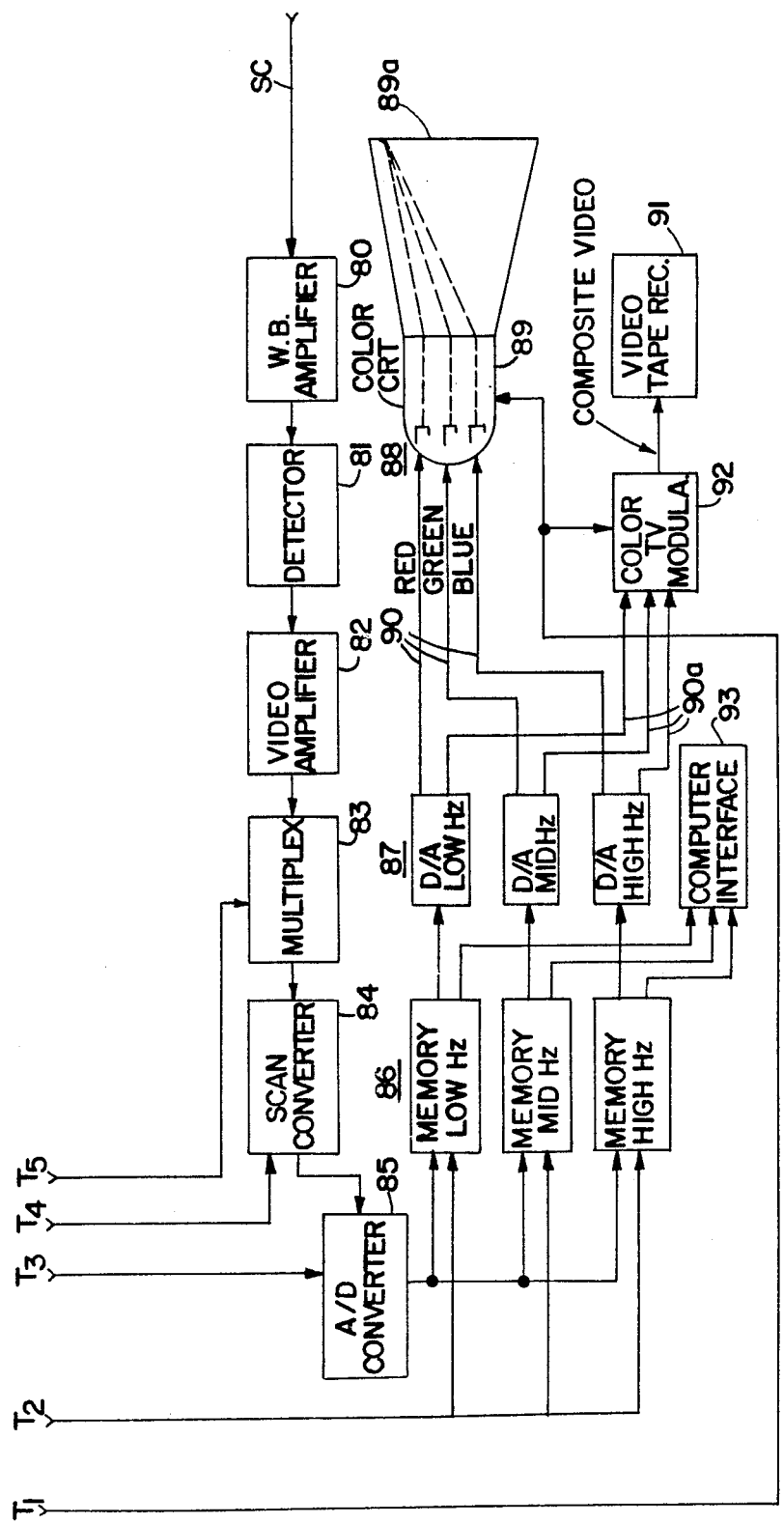
FIG. 6 illustrates, in block diagram form, electronic means compatible with the means illustrated in FIGS. 4, 4a and 4b, for electronically forming a Spectra-color B-scan ultrasonogram.
Figures 7, 8:
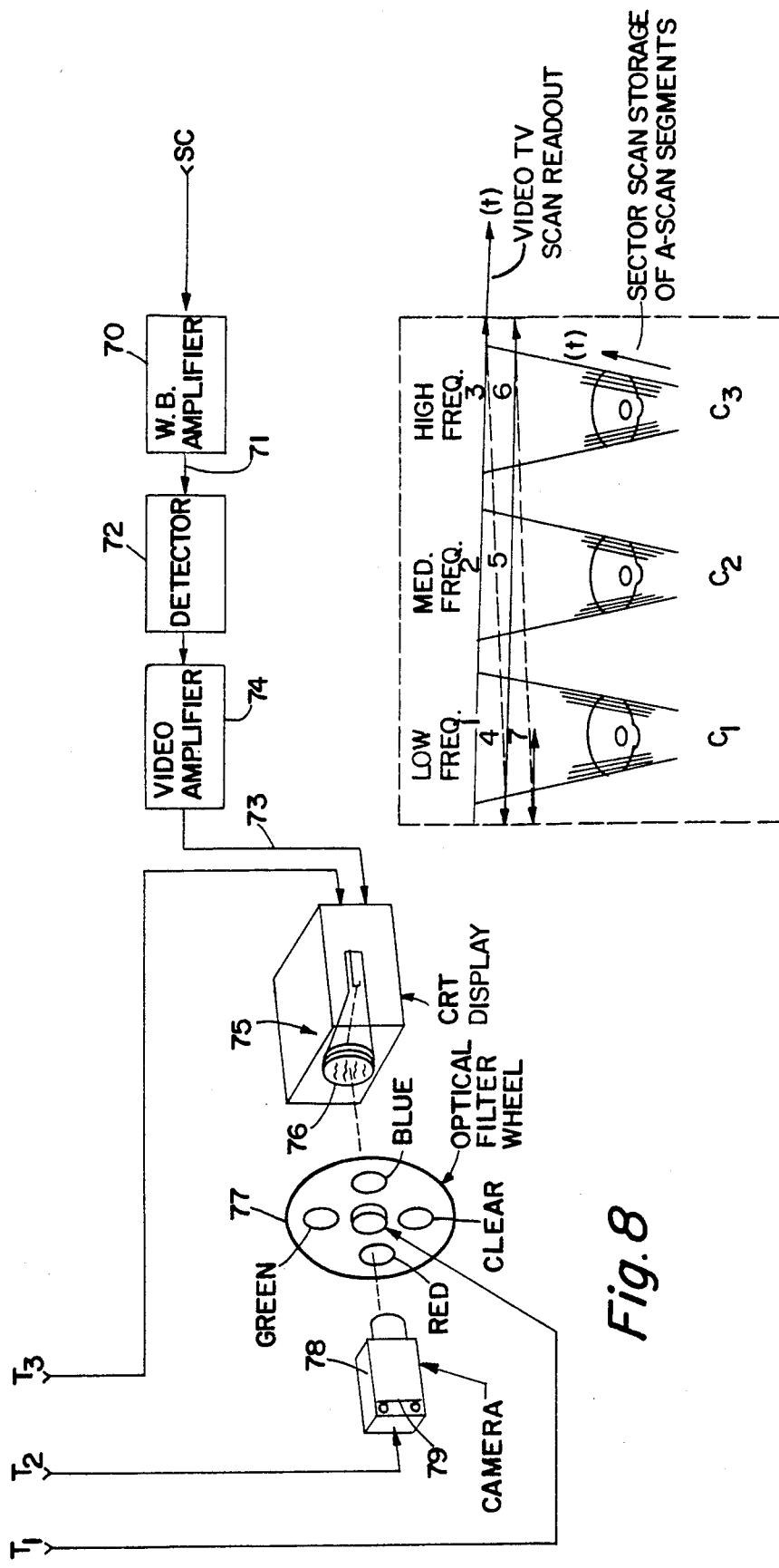
FIG. 7 illustrates the loading and reading of the scan converter illustrated in FIG. 6.
FIG. 8 illustrates, in block diagram form, electronic means compatible with the means illustrated in FIGS. 4, 4a and 4b for photographically forming a Spectra-color B-scan ultrasonogram.
Figure 9:
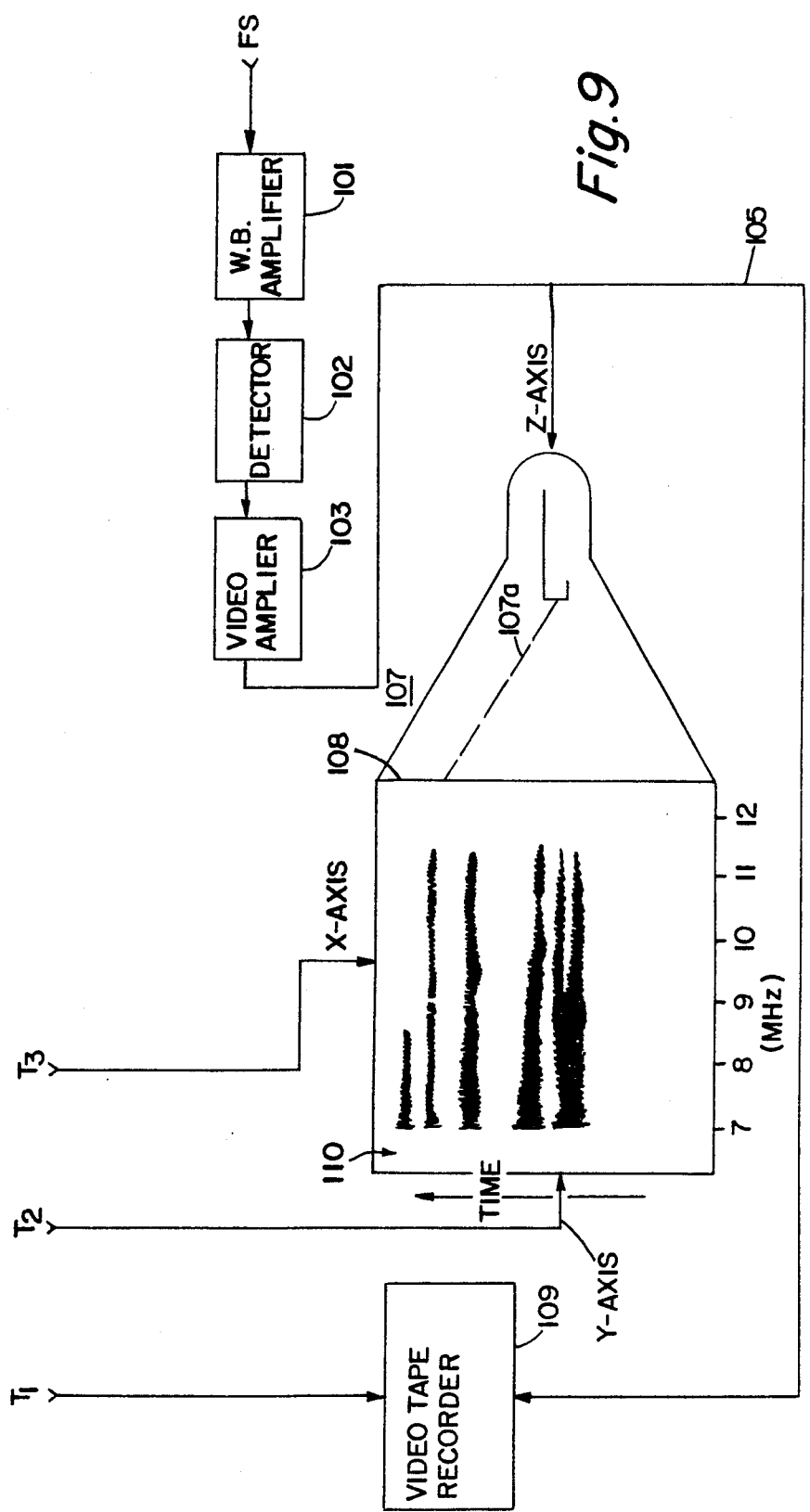
FIG. 9 illustrates, in block diagram form, electronic means compatible with the means illustrated in FIGS. 4, 4a and 4b for forming an F-scan ultrasonogram.

Control signals $T_1$ through $T_5$ are provided for interface with the various display means illustrated by FIGS. 6, 8, and 9.

Interposed between the electronic means illustrated in FIG 4a and the various display means (FIGS. 6, 8, 9), to be subsequently discussed, is compensating electronic delay means illustrated in FIG. 4b.

The compensating delay means serve to place the various signals $C_1$-$C_n$ forming signals SC or FS in proper phase relationship to ensure proper color-overlay registration in the case of Spectra-color B-scan and to ensure proper axes positioning in the case of F-scan.

Delays 352, 362 serve to compensate for the unequal delays of the filters 52, 62 so as to make filters 52 appear to have equal delays and to make filters 62 to appear to have equal delays. Switch $SW_4$ and $SW_5$ are synchronized in both movement and position with switches $SW_2$ and $SW_3$ (FIG. 4a) by control signals 53, 63 (FIG. 4, 4a).

It is recognized that, where filters 52 have equal delays and where filters 62 have equal delays, the circuitry means of FIG. 4b can be deleted and that a single delay could be substituted for delays 54 and 64 discussed previously.

Means for electronically forming a Spectra-color B-scan ultrasonogram on the display face of a color cathode ray tube are illustrated by FIG. 6.

The Spectra-color signal SC (FIG. 4b), containing 1200 unique spectrum signal portions representing frequency bands $C_1'$, $C_2'$, $C_3'$ (FIG. 2) and derived from 1200 echo trains $C_d$ provided by the theretofore noted electronic mode scanning sequence, are sequentially fed to a multiplerer 83 via a wideband amplifier 80, a video detector 81 and a video amplifier 82. The multiplexed, detected Spectra-color signal SC is sequentially recorded by A-scan line sequence within a scan converter 84 of known type which has been electronically separated into three distinct silicon storage target regions (FIG. 7) corresponding to the heretofore noted low Hz, mid Hz, and high Hz spectrum signals ($C_1'$, $C_2'$, $C_3'$) which constitute the Spectra-color signal SC. A Pep-400 scan converter (princeton Electronic Products) having approximately a 30 gray-shade capability has been found suitable. The placement on the spectrum signal portions $C_1$, $C_2$, $C_3$ in their proper silicon target region (low Hz, mid Hz, high Hz) of the scan converter 84 is directed by the multiplexer regulated by a control signal $T_5$ from the central control 25 (FIG. 4).

Turning to FIG. 7, which illustrates three separate B-scan ultrasonograms of an occular area, with the 1200 spectrum signal portions $C_1$, $C_2$, $C_3$ group deposited by sector scan sequence into the scan converter 84 silicon storage target areas, a readout operation is initiated with horizontal sweeps across the scan converter (approximately normal to the A-scan line storage input lines) corresponding to individual lines of a standard television rastor. A first horizontal sweep across the scan converter sequentially produces three television line components 1, 2, 3 of data corresponding to the low Hz, mid Hz, and high Hz spectrum signal $C_1$, $C_2$, $C_3$, as illustrated by FIG. 7. The readout rate across the scan converter is adjusted to be one-third that of a standard television line rate so that the readout rate for the individual low Hz, mid Hz, and high Hz, information lines corresponds exactly to the standard television readout rate.

To display the scan converter stored Spectra-color signal data SC as a multicolor Spectra-color B-scan ultrasonogram on a display face 89a of a cathode ray tube 89 (FIG. 6), all three Spectra-color information lines (low Hz, mid Hz, high Hz) are applied simultaneously to three primary color guns 88 of the color cathode ray tube 89 to effect the requisite color coding, as heretofore disclosed with the Spectra-color B-scan method.

Simultaneous presentation of the Spectra-color signal data SC to the color cathode ray tube guns 88 is provided by digital memory buffer means, including an encoding analog-to-digital converter 85, three digital memories 86 (low Hz, mid Hz, high Hz) and three corresponding decoding digital-to-analog converters 87.

Each of the three Spectra-color informaion lines, for example, lines 1, 2, 3 (FIG. 7), (low Hz, mid Hz, high Hz) from the scan converter 84 is sequentially inputted to the analog-to-digital converter 85, which is clocked at, for example a 5 MHz rate. Each of the three data lines is sequentially converted into 256 8-bit words and is directed into its respective one of the three digital memories 87. After sequential memory unit storage is complete, the memories are simultaneously stripped via the digital-to-analog converters 87 to provide low Hz, mid Hz, and high Hz Spectra-color video signals to the color guns 88 (red, green, blue) of the color cathode ray tube 89 to present a signal color television line. On successive readout sweeps across the scan converter, the three memory locations are refreshed with new data in the same sequence. Since a composite color television line is generated during the refilling of each of the three memory units, only one color at a time is changed for each new line on the display face 89a. The three video signals 90 are applied directly to the three guns of the standard television cathode ray tube 89 to form a Spectra-color B-scan ultrasonogram constituted by the overlaying and color-coding of the three separate (low Hz, mid Hz, high Hz) B-scan ultrasonograms contained in the scan connecter storage area (FIG. 7). Also, comparable video signals 90a can be applied to a video modulator 91, which modulates the carrier frequency on an unoccupied television channel. A composite video signal which has standard component synchronization signals can be applied through a video mixer to any standard color television.

Peripheral equipment for the electronic Spectra-color B-scan system to FIG. 6 could include a video tape recorder 92 for the storage of Spectra-color B-scan ultrasonograms and a computer interface 93 to facilitate more extensive data processing and analysis.

Control signals supplied by the central control 25 of FIG. 4 include video sync signals $T_1$, memory address signals $T_2$, memory selection signals $T_3$, scan converter address signals $T_4$, and multiplex signals $T_5$.

Turning to FIG. 8, there is shown means for photographically forming a Spectra-color B-scan ultrasonogram in accordance with the invention.

The Spectra-color signal SC, derived as previously noted with regard to FIGS. 4a and 4b, which includes the spectrum signals $C_1$, $C_2$, $C_3$ generated by the transducer scanning in the heretofore-described photographic mode, is amplified by a wideband amplifier 70 which applies the amplified Spectra-color signal 71 to a video detector 72. The detector output 73, amplified by a suitable amplifier 74, is superimposed on a suitable ramp voltage for application to a monochrome cathode ray tube 75 to form a conventional intensity modulated B-scan ultrasonogram display utilizing 400 spectrum signals derived via the low Hz filter from the first sector scan echo trains $C_d$.

The above-noted process is repeated to form a second B-scan ultrasonogram display from 400 spectrum signals derived via the mid Hz filter from a second sector scan group of echo trains $C_d$, generally identical to those echo trains utilized to form the first low Hz filtered B-scan display. Likewise, 400 spectrum signals derived via the high Hz filter are used to form a third high Hz filtered B-scan display.

Thus, a display face 76 of the cathode ray tube 75 sequentially displays three B-scan ultrasonograms representing predetermined frequency spectrum portions $C_1'$, $C_2'$, $C_3'$ (FIG. 2) of the detected echo train portions $C_d$ resulting from the complex wave applied pulses $C_p$.

To form a Spectra-color B-scan ultrasonogram in accordance with the invention, a color-coding optical filter wheel 77 and a photographic, color film containing, still-picture camera 78 are utilized. A Hasselblad, Model 500 El/M camera with motor-driven film advance and electronic shutter and a Ziess 80 mm. Planar F2.8 lens with Compur shutter and a No. 55 Extension tube have been found suitable.

The noted red, green, and blue filters are, respectively, Kodak Wratten Gelatin No. 25, No. 57. and No. 47. A clear optical filter can be provided to form monochrome Spectra-color B-scans, wherein the clear filter is fixed between the camera 78 and the display face 76 during the sequential presentation of the three-frequency band representative B-scan displays. The display face 76 utilizes known long persistency phosphors of, for example, the P-7 type.

With a fixed photosensitive color film medium 79 such as a single film frame, and with the camera focused on the display face 76, the optical filters are rotationally sequenced in synchronism with the sequential formation of the B-scan displays noted above. Thus, the photosensitive medium 79 is sequentially subjected to overlaying or superimposed red, green, and blue B-scan ultrasonograms representative of the low, mid and high Hz frequency bands $C_1',C_2',C_3'$ illustrated in FIG. 2. The color print resulting from conventional processing of film medium 79 constitutes a Spectra-color B-scan ultrasonogram.

Kodak High Speed Tungsten-type Ektachrome film exposed at F2.8 and processed to provide a 310 ASA has been found to be suitable for formation of Spectra-color B-scan ultrasonograms in accordance with the invention.

Control signals $T_1,T_2,T_3$ respectively control optical filter wheel synchronization, camera shutter movement, and cathode ray tube sweep voltages.

Turning to FIG. 9, electronic F-scan ultrasonogram formation means compatible with the electronic means of FIGS. 4, 4a and 4b is illustrated.

With switch $SW_1$ (FIG. 4) in the heretofore-noted F-scan position, a sequence of F-scan generated spectrum signals $C_1-C_{16}$ are amplified, video-detected, and video-amplified by a respective wideband amplifier 101, a video detector 102, and a video amplifier 103. The amplified video-detected F-scan spectrum signals 105 are applied to a monochrome cathode ray tube 107 so as to intensity-modulate as a function of time an associated CRT electronic beam 107a which illuminates a display face 108, utilizing long persistency phosphors of, for example, the P-7 in a well known manner. X-axis movement of the beam is regulated by a staircase voltage type control signal $T_3$ related to the frequency bands $C_1'-C_{16}'$ (FIG. 3) represented by the displayed spectrum signals $C_1-C_{16}$.

Y-axis position of the display beam is regulated by an A-scan type echo time response control signal $T_2$ (acoustic travel time).

Since only a single F-scan ultrasonogram of an A-scan line segment of a tissue specimen can be monitored on the cathode ray tube 107, a video recorder 109 is provided to record and play back multiple F-scan ultrasonograms of A-scan line tissue segments. Proper synchronization between the video tape recorder 109 and scanning by the transducer 10 is provided by an F-scan synchronization signal $T_1$.

It can be seen that from the illustrative example of an F-scan ultrasonogram 110 the frequency response of a particular A-scan line tissue specimen segment varies.

Although preferred embodiments of this invention are illustrated, it should be understood that various modifications and rearrangements of parts may be resorted to without departing from the scope of the invention disclosed and claimed herein.

What is claimed is:

1. A method for characterizing a soft tissue specimen as a function of its effect on the frequency spectrum of an applied signal comprising the steps of:

applying a first ultrasonic frequency band complex wave signal to a soft tissue specimen, said applied signal having a first bandwidth and center frequency;

detecting at least a portion of said applied signal as affected by said specimen;

filtering said detected signal portion to provide a plurality of frequency spectrum signals indicative of the frequency content of said detected signal portion, said spectrum signals representing a respective plurality of frequency bands extending over at least a portion of said first frequency band, said frequency bands having bandwidths substantially less than said first bandwidth;

processing said spectrum signals to represent the approximate instantaneous power spectrum of said detected portion; and simultaneously displaying said processed spectrum signals in a visual format for comparison of the frequency and energy magnitude of said spectrum signals relative to each other, said visual format being spatially related to the structure of said specimen as a function of the time between said applying and said detecting.

2. A method according to claim 1 wherein said processing includes the step of multiplying each of said spectrum signals by said detected signal portion from which each of said spectrum signals was derived via said filtering, and includes the step of delaying said detected signal portion prior to said multiplying step for a period of time approximately equal to the time required for said filtering, said delayed detected signal portion and said respective spectrum signal being in phase with each other at the time of said multiplying.

3. A method according to claim 2, including the step of utilizing only a negative portion of said multiplied spectrum signals for said displaying step.

4. A method according to claim 1, wherein said displaying step includes color coding said processed spectrum signals, said visual format being arranged to include a two-dimensional multicolor display composed from said color coded spectrum signals, said display being spatially related to the structure of said spectrum.

5. A method according to claim 1, wherein said displaying step includes graphically representing relative to axis X-Y lines said processed spectrum signals as a function of their frequency and as a function of the amount of time between said applying and said detecting.

6. A device for characterizing the structure and composition of a soft tissue specimen as a function of its effect on the frequency spectrum of an ultrasonic signal comprising:

means for generating an ultrasonic signal of first frequency band complex wave pulses having substantially identical bandwidths and center frequencies;

means for applying said ultrasonic signal to a soft tissue specimen;

means for detecting at least a portion of said ultrasonic signal reflected from said specimen;

means for filtering at least a pulse portion of said detected signal portion to provide at least three frequency spectrum signals indicative of the frequency content of said detected signal portion, said spectrum signals having frequency bands, said frequency bands extending over said first frequency band and having bandwidths substantially less than said identical bandwidths;

means for processing said spectrum signals to represent the approximate instantaneous power spectrum of said detected portion;

means for color coding each of said processed spectrum signals with a respective color; and means for simultaneously displaying in a multicolor B-scan format the frequency and energy magnitude of said color coded processed spectrum signals relative to spatial locations of said specimen.

7. A device according to claim 6, wherein each of said processed spectrum signals is color coded with a respective one of the primary colors.

8. A device according to claim 6 wherein said means for processing includes:

means for multiplying each of said spectrum signals by said detected signal portion from which each of said spectrum signals was derived via said filter means; and means for delaying said detected portion prior to said multiplying for a period of time approximately equal to the time required for said filtering, said delayed detected portion and said respective spectrum signal being in phase with each other at the time of said multiplying, said spectrum signals multiplied by said delayed detected signal portion representing said approximate instantaneous power spectrum of said detected signal portion.

9. A device according to claim 6 wherein said means for displaying includes:

means for visually displaying consecutive single color B-scan formats for each of said processed spectrum signals; and means for consecutively photographing a respective one of said consecutive B-scan formats on a photosensitive surface wherein said multicolor B-scan format is composed of said consecutive B-scan formats superimposed upon said photosensitive surface.

10. A device according to claim 9 wherein said means for color coding includes optical color filters interposed between said consecutive B-scan formats and said photosensitive surface.

11. A device according to claim 6 wherein said means for displaying includes:

cathode ray tube means having at least one color gun means; and video processing means for applying said color coded processed spectrum signals to said color gun means to visually display on said cathode ray tube said multicolor B-scan format.

12. A device for characterizing the structure and composition of a soft tissue specimen as a function of its effect on the frequency spectrum of an ultrasonic signal comprising:

means for generating an ultrasonic signal of first frequency band complex wave pulses having substantially identical bandwidths and center frequencies;

means for applying said ultrasonic signal to a soft tissue specimen;

means for detecting at least a portion of said ultrasonic signal reflected from said specimen;

means for filtering at least a pulse portion of said detected signal portion to provide a plurality of spectrum signals indicative of the frequency content of said detected signal portion, said spectrum signals having frequency bands, said frequency bands extending over said first frequency band and having bandwidths substantially less than said identical bandwidths;

means for processing said spectrum signals to represent the approximate instantaneous power spectrum of said detected portion; and means for graphically displaying said processed spectrum signals as a function of their center frequencies and energy magnitudes, and as a function of the time between said applying and said detecting, said center frequencies being related to an X-axis line, said time between said applying and detecting being related to a corresponding Y-axis line, and said energy magnitude being related to a Z-axis.

13. A device according to claim 12 wherein said spectrum signals are indicative of the approximate time domain Fourier series of said detected signal portion.

14. A device according to claim 12 wherein said means for graphically displaying includes a cathode ray tube screen illuminated by the effect of a related electron beam, said beam being intensity modulated as a function of said energy magnitude of said processed spectrum signals.

15. A device according to claim 12 wherein said means for graphically displaying said processed spectrum signal utilizes an A-scan type format at each of said center frequencies of said spectrum signals.

16. A device according to claim 12 wherein said means for processing includes:

means for multiplying each of said spectrum signals by said detected signal portion from which each of said spectrum signals was derived via said filter means; and means for delaying said detected portion prior to said multiplying for a period of time approximately equal to the time required for said filtering, said delayed detected portion and said respective spectrum signal being in phase with each other at the time of said multiplying, said spectrum signals multiplied by said delayed detected signal portion representing said approximate instantaneous power spectrum of said detected signal portion.

* * * * *